W. WILSON AND S. PRICE.
LOCKING ATTACHMENT FOR SPARE TIRE HOLDERS.
APPLICATION FILED FEB. 4, 1921.
1,430,137.                                 Patented Sept. 26, 1922.
3 SHEETS—SHEET 1.
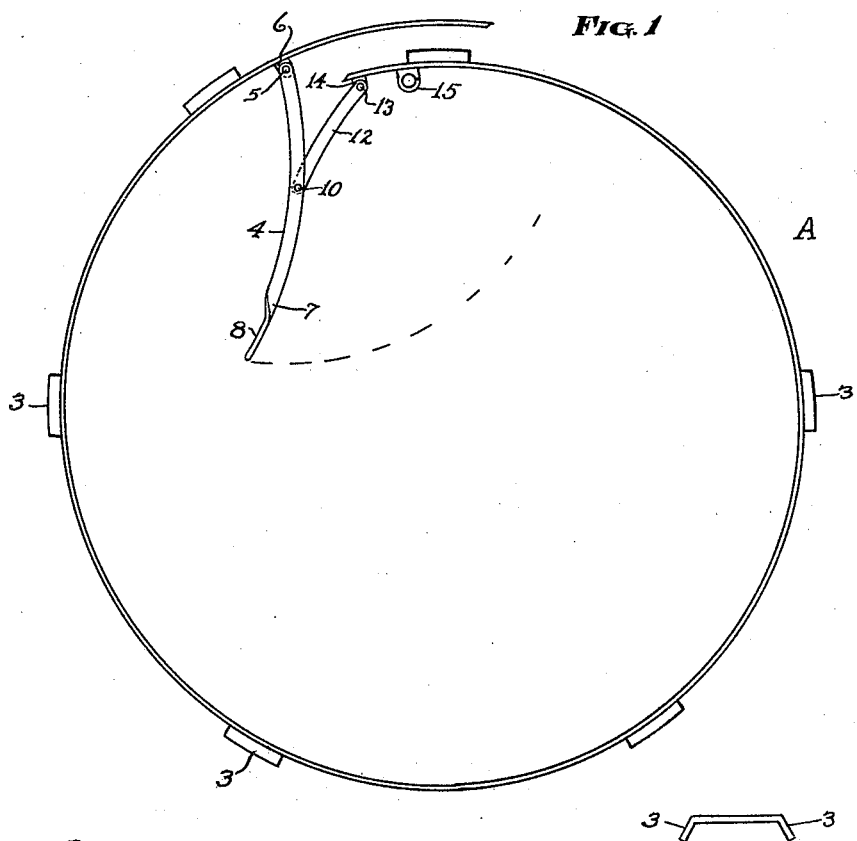
INVENTOR.
Weaver Wilson
Sam Price
BY
*U. G. Charles*
ATTORNEY

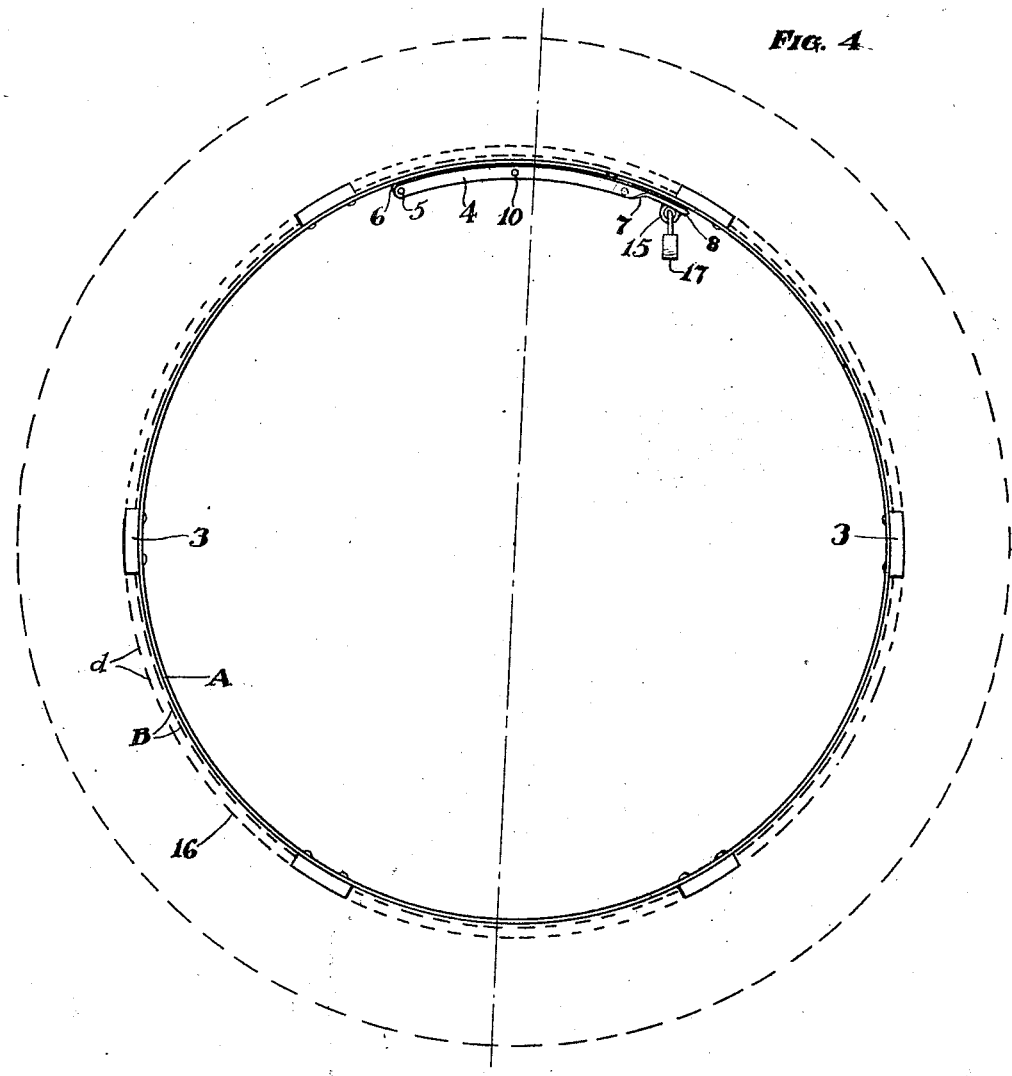

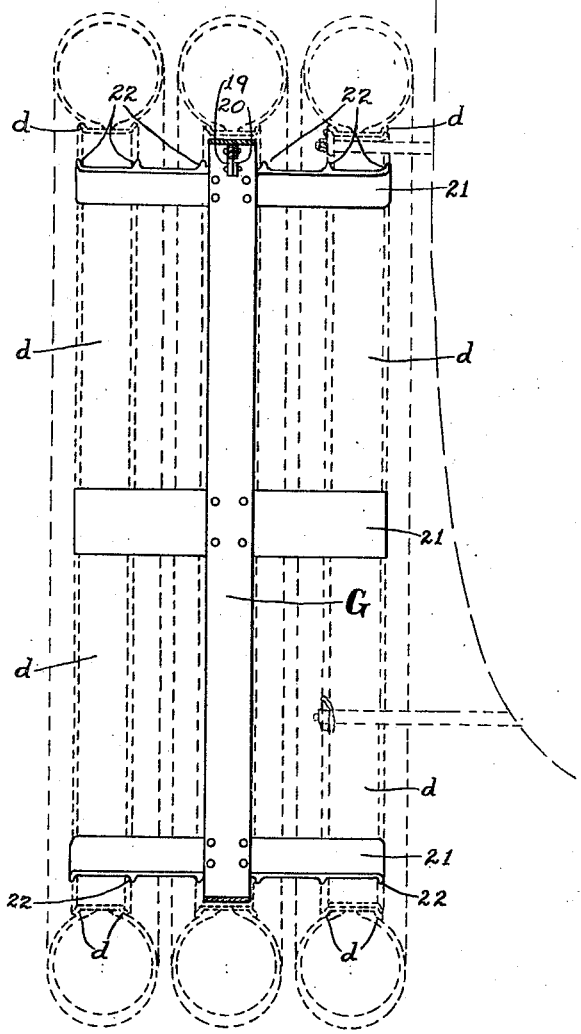

Patented Sept. 26, 1922.

1,430,137

UNITED STATES PATENT OFFICE.

WEAVER WILSON AND SAM PRICE, OF WELLINGTON, KANSAS.

LOCKING ATTACHMENT FOR SPARE-TIRE HOLDERS.

Application filed February 4, 1921. Serial No. 442,445.

*To all whom it may concern:*

Be it known that we, WEAVER WILSON and SAM PRICE, both citizens of the United States, and residents of Wellington, in the county of Sumner and State of Kansas, have jointly invented certain new and useful Improvements in a Locking Attachment for Spare-Tire Holders, of which the following is a specification.

Our invention relates to means for holding one or more spare tires upon the rear of motor cars. One object of the invention is to provide a tire holder which is lockable to prevent removal of the tire or tires therefrom without opening the lock; this locking being effected without the use of chains, or the like. Our improvement is made as an attachment for the ordinary ring type of tire holder, which consists of a rigid metal ring sized to receive a spare tire thereon.

A further object of the invention is to provide a tire-holding attachment having a capacity of two or three tires, but constructed for attachment to a single-tire holder of the usual type; the multiple holder comprising means for simultaneously locking on as many tires as may be placed thereon.

The invention will be better understood by reference to the accompanying three sheets of drawings, in which—

Figure 1 is an elevation of a tire-holding and locking attachment, in open position and detached; Fig. 2 is a detail view of the slotted handle; Fig. 3 is a detail view of one pair of lugs, detached; Fig. 4 is an elevation of the attachment in position upon a common tire holder and locked, showing the latter and a tire in broken lines; Fig. 5 is a central vertical section of our attachment as made for three tires, the said tires and their metal rims being shown in broken lines.

Referring first to Fig. 1:—A flat band of spring steel A is curved on a radius slightly less in diameter than that of the solid tire holder or ring B, (Fig. 4) commonly attached to brackets carried from the rear of an automobile. Secured by rivets or electric welds to the periphery of the split ring A are seen channel-like members (Fig. 3) arranged at spaced intervals, the sides 3, 3 of these members being spaced apart sufficiently and of such length that when positioned as in Fig. 4, they extend up upon the side elements of the tire holding ring B, which in its turn provides the seat for the rim "*d*" of the tire casing carried as a spare.

A curved lever is fulcrumed on a pin 5 held by a lug 6 secured to the band at a distance from the outer end of the band. This lever is twisted 90 degrees as at 7 to form a hasp 8, in which is a slot 9. A pin 10 on the lever 4 is connected by a curved link 12 to a pin 13, held by a lug 14 secured to the inner end of the band. On the inner face of the band is secured an eye 15, in position to enter the slot 9 when the lever 4 is brought to its closed position, shown by Fig. 4. This movement of the lever spreads apart the ends of the band, and brings the eye 15 into the position mentioned.

To apply the device, to a holder on which is a tire, the band A is contracted as shown on Fig. 1 to permit some of the lugs 3 to straddle the tire holder B and the metal rim *d* in the tire. The band A is then expanded by turning the lever 4 to closed position; this forces all of the lugs 3 outward; a padlock 17 is then passed through the eye 15 and locked. It will now be impossible to remove the tire from the holder, as will be readily understood.

The lever 4 and link 12 are curved to fit the inner periphery of the band A, as shown.

Where two or three tires are to be carried, our attachment may be constructed as shown in Fig. 5, in which: G denotes a steel band like the band A in all respects (though it may be made of thicker metal) and provided with a locking lever 19, a link 20, etc. Instead of the single pairs of lugs, a series of metal cross-arms 21 are secured to the band as shown. Each cross-arm is provided with as many pairs of lugs 22 as there are tires to be held. Said cross-arms are substantially rigid. The lugs 22 will engage the rims *d* of the outer tires, while the band G engages the tire-holder ring B; the intermediate lugs 22 engaging the rim of the middle tire. The operation of attaching and removing a tire will be understood without further description, and it will be apparent that our invention attains the hereinbefore-stated objects in a simple and convenient manner. We do not limit our claims to the precise forms and constructions represented in the drawings.

Having described our invention, we claim as new and desire to secure by Letters Patent:

1. In combination, a solid ring-like tire holder as attached to the rear portion of an automobile, a tire casing arranged on a rim, said rim being arranged in position upon and surrounding said tire holder; a locking attachment comprising a split metallic band of lesser diameter than said tire holder arranged within and adjacent to said holder, lug elements rigidly arranged upon the periphery of said attachment with the flanges thereof extending upon the opposite sides of said tire holder; and means for contracting and expanding said split ring from or towards said tire holder, comprising a lever pivotally attached to the outer inner portion of said split ring, said lever having an end portion fashioned as a hasp, a link pivotally connecting to said lever and to the inner portion of the opposite end of said split ring, an eye rigidly positioned near the inner end portion of said split ring beyond the link and adapted to enter said hasp when the said split ring is expanded and means for securing said eye and hasp in a locking engagement.

2. In combination, a solid ring-like tire holder, as attached to the rear portion of an automobile, a locking attachment comprising a split metallic band of lesser diameter arranged within and adjacent to said holder; transverse cross arms arranged and secured at spaced intervals upon the periphery of said band and a pair of lug elements on each cross arm extending beyond to engage the opposite side elements of said tire holder, and other lug elements on each cross arm arranged in pairs, outwardly extending, and on either side of the first mentioned paired lug elements, a lever handle pivotally secured to one end of said band, a hasp on said handle, a link connecting said handle to the opposite end of said band and an eye on said band engageable with said hasp when said band is expanded.

WEAVER WILSON.
SAM PRICE.

Witnesses:
C. L. HASLET,
D. B. SELL.